(12) United States Patent
Melton

(10) Patent No.: US 9,167,753 B2
(45) Date of Patent: Oct. 27, 2015

(54) PLANT SUPPORT ASSEMBLY

(71) Applicant: Patty A Melton, San Diego, CA (US)

(72) Inventor: Patty A Melton, San Diego, CA (US)

(*) Notice: Subject to any disclaimer, the term of this patent is extended or adjusted under 35 U.S.C. 154(b) by 139 days.

(21) Appl. No.: 13/918,558

(22) Filed: Jun. 14, 2013

(65) Prior Publication Data

US 2014/0366437 A1  Dec. 18, 2014

(51) Int. Cl.
*A01G 17/14* (2006.01)
*A01G 9/12* (2006.01)

(52) U.S. Cl.
CPC ..................... *A01G 9/122* (2013.01)

(58) Field of Classification Search
CPC ........ A01A 14/04; A01G 14/10; A01G 17/14
USPC .......................... 47/44, 46, 47; D11/130; D8/1
See application file for complete search history.

(56) References Cited

U.S. PATENT DOCUMENTS

| | | | |
|---|---|---|---|
| 1,174,901 A * | 3/1916 | Schaible | 47/47 |
| 1,266,749 A * | 5/1918 | Abbott | 211/205 |
| 3,142,935 A * | 8/1964 | Campos | 47/48.5 |
| D239,852 S * | 5/1976 | Stake | D8/1 |
| 4,026,068 A * | 5/1977 | Tepper | 47/45 |
| 4,677,788 A * | 7/1987 | Mastandrea | 47/47 |
| 4,841,670 A * | 6/1989 | Bitter | 47/47 |
| 4,991,344 A * | 2/1991 | Carney | 47/39 |
| 5,067,274 A * | 11/1991 | Lewis | 47/47 |
| 5,341,593 A * | 8/1994 | Foreman | 47/47 |
| 5,640,802 A * | 6/1997 | Elliott | 47/45 |
| 5,964,057 A * | 10/1999 | Korte-Jungermann | 47/70 |
| 6,000,172 A * | 12/1999 | Ballarino | 47/47 |
| 6,385,901 B1 * | 5/2002 | Wahlberg | 47/45 |
| 7,941,967 B2 * | 5/2011 | Jolley | 47/39 |
| 2008/0209804 A1 * | 9/2008 | Stradiot | 47/64 |

* cited by examiner

Primary Examiner — William Gilbert

(57) ABSTRACT

A base component and a plurality of plant support components interconnect in various combinations to form an organically configured, size adjustable plant support structure for a growing plant. The base component with spaced root-like stakes planted in the soil supports multiple components each having a central vertical trunk-like structure and extending limb-like and branch-like supports forming a tree-like configuration. Ties of various length soft fabric strips attach a growing plant to a molded exterior configured and colored to resemble tree bark for high friction to securely support the plant and plant produce.

8 Claims, 4 Drawing Sheets

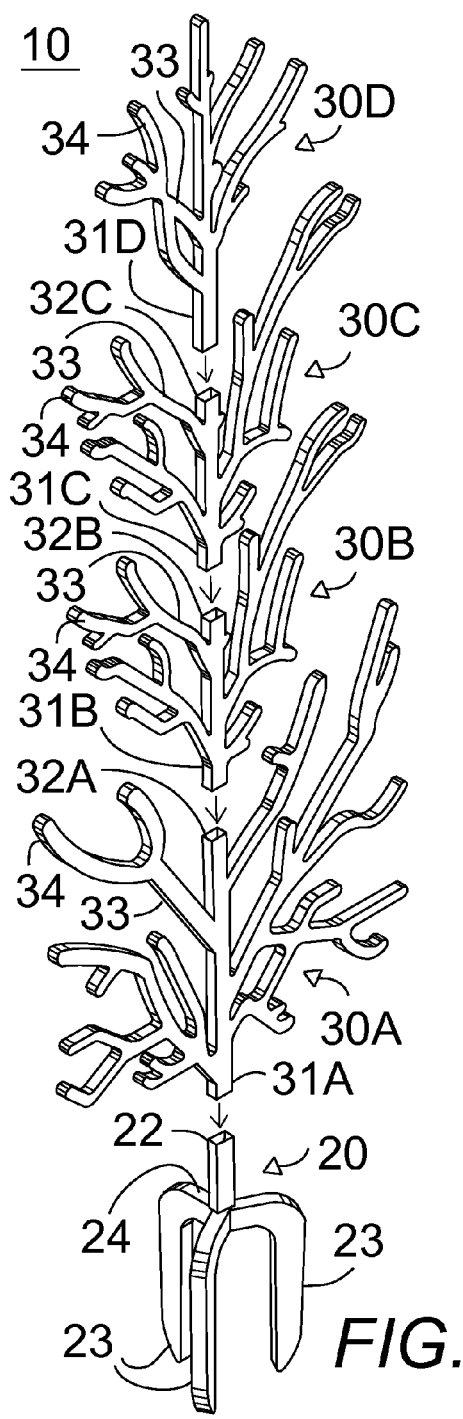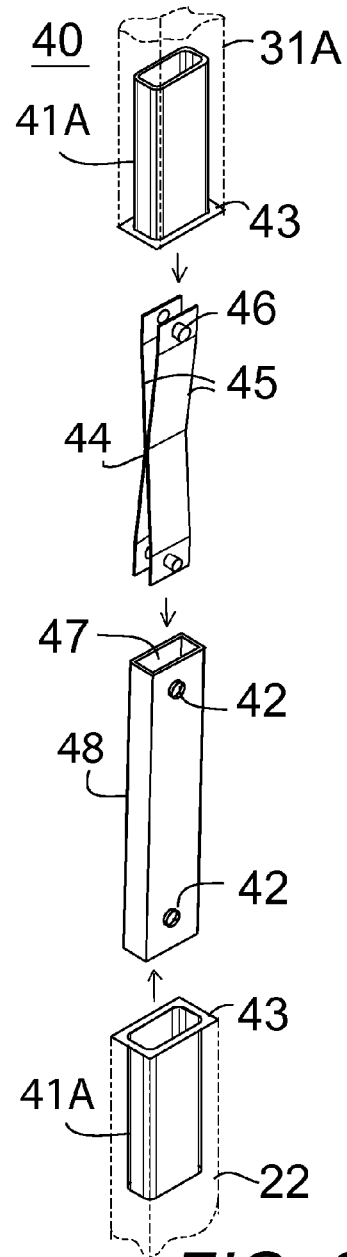

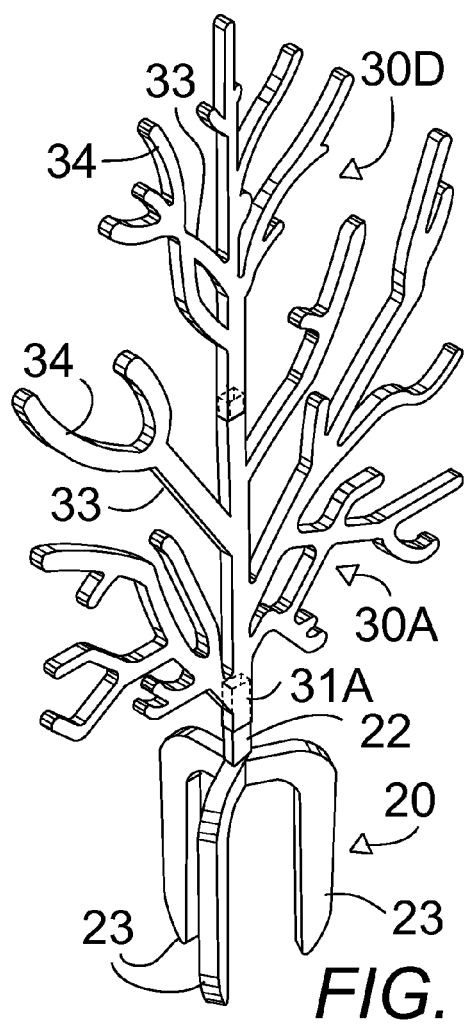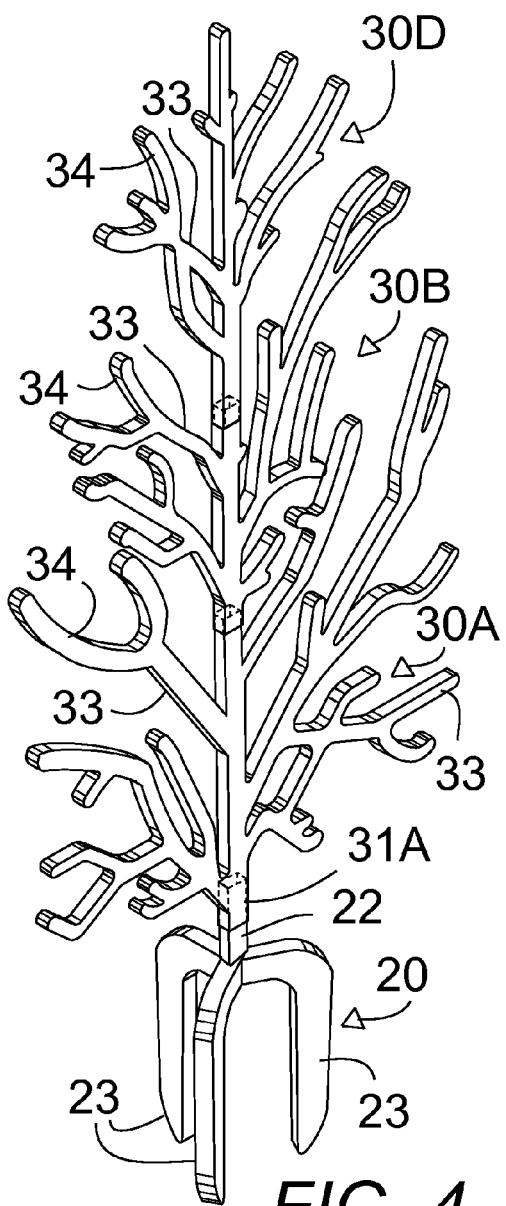

PLANT SUPPORT ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to plant supports and in particular to a multiple component assembly system for an organically configured, size adaptable plant support structure for a growing plant, the plant support structure comprising a rigid trunk-like structure configured in a vertical position having a base formed of at least three arched pointed rigid support prongs rigidly connected to the trunk portion extending outwardly and downwardly in a spaced array around a base of the trunk portion, the at least three support prongs inserted into the ground to maintain the trunk portion in an upright vertical position for maximum strength and stability; a plurality of upwardly tapering insertable trunk extensions to extend the height of the plant support at varying heights to add trunk extensions to make the plant support taller as a plant grows taller and for tall plants or remove trunk extensions to make the plant support shorter for new plants or different plants which grow to different heights, each of the trunk extensions having a plurality of organically configured spaced and multi-directional tapering limb structures extending outwardly in different directions from the trunk extensions, so that when the base prongs are inserted in the ground the plant support is structured like a small tree rooted in the ground to enable a plant to grow in a natural configuration with the strong support of the extendable trunk configuration to support the trunk portions of the plant and the extended tapering limb structures giving natural support with spacing to allow the branches of the plant to grow to their fullest natural growth with maximum produce yield and minimal loss of produce (including fruits, vegetables, berries and any other plant produce yields).

2. Description of Related Art Including Information Disclosed Under 37 CFR 1.97 and 1.98

Prior art trellis configurations for supporting growing plants generally have made-man structural configurations based on mechanical structural shapes which do not take the form of the natural organic growth pattern of plants. Many of the prior art devices do not adaptably support very tall plants and do not provide maximum structural support branches with the plant branches growing alongside the support branches for maximum support so that plants may not obtain maximum growth and the edible portions of the plant may not be properly supported so that many of the edible portions fall to the ground losing some of the yield of the plant.

Most prior art devices do not provide a strong base buried well within the ground supporting a strong central support resembling a tree trunk with roots underground.

U.S. Pat. No. 5,067,274, issued Nov. 26, 1991 to Lewis, indicates a tomato pole having a plurality of spaced, V-shaped slanted slots entrant from one side thereof. The pole is hollow and can be driven into the ground, with one or more of the slots preferably being subterranean in use such that irrigation water can be poured into the top of the pole and will irrigate through the lower notches. The spaced notches enable the user to use anything available for transverse tomato plant support sticks.

U.S. Pat. No. 5,341,593, issued Aug. 30, 1994 to Foreman, puts forth a small spring steel stake used to support a large tomato plant. The plant is held close to the stake so that the stake supports the plant with its weight pulling substantially straight down along the axis of the stake. Rings are optionally used to support only the branches and not the stem of the plant. Since the tomatoes grow close to the stem, a heavy load of tomatoes adds little weight to the rings. A shade, designed to be installed whenever the gardener decides the time is right, is detachably mounted to the top of the plant support and consists of spaced apart shade members so that rain water captured by the shade members may be directed to the roots of the plant. An optional deck planter adapted to secure the stake in its vertical position facilitates the use of the plant support for urban and even indoor gardening conditions.

U.S. Pat. No. 4,841,670, issued Jun. 27, 1989 to Bitter, describes an apparatus for supporting growing plants such as tomato plants, including radially arranged poles projecting from an annular base mounted on the top of a soil containing pot. The stems or branches of the plant are guided upwardly and within the space defined by the poles by means of strings tying the stems or branches securely around the poles.

U.S. Pat. No. 5,964,057, issued Oct. 12, 1999 to Korte-Jungermann, is for a plant holder with several essentially identically shaped elements (2), which are arranged in a vertical position when in use, and at least one supporting ring (3), which is arranged in a horizontal position when in use, which includes easily removable retention devices for retaining several vertical elements (2) along the perimeter of the supporting ring (3) and at heights corresponding to the vertical elements. The vertical elements (2) may exhibit an essentially rectangular profile. Recesses (10) for acceptance of the vertical elements can be arranged along the supporting ring, of which there is at least one, while protrusions (12) can be arranged along the lateral surfaces of the vertical elements which, when assembled, snap into corresponding grooves (11) in the recesses in the supporting ring (3).

U.S. Pat. No. 6,000,172, issued Dec. 14, 1999 to Ballarino, discloses an improved plant holder for use in a garden for supporting plants and vines as they grow and mature. The plant holder comprises a plurality of identical posts which may be driven into the ground by means of pointed ends. Each post has a plurality of hooks in pairs at different heights along the post. Further, between the posts rods are provided that clip into the hooks to lie in a horizontal plane at each of the different levels of the hooks. Since the hooks are paired on either side of the posts at different levels then a pair of rods may also be found at the corresponding levels. Each pair of rods is connected by C-clips which snap over the rods. A plant, such as a tomato plant, may be supported by this structure by driving the posts on either side of the plant, assembling the rods into the hooks on either sides of the plant stems, then applying the clips to secure the rods into position. Further, the clips are sufficiently spaced on the rods allowing a branch of the plant to be drawn through an opening in the clips for further support of the branches.

U.S. Pat. No. 6,385,901, issued May 14, 2002 to Wahlberg, provides a plant support cage apparatus wherein two or more panels of rectangular shape are joined on the vertical edges by a series of coil cavity and corresponding rod connections alternated by hook restraints. Unit thus formed when the plurality of the panels is fully joined together is a cylindrical cage. All connections made at the vertical edges of the panels are formed from and are part of the panel lattice. The unit is rigid as a separate unit and stable when pressed in the ground by the stakes that are extensions also part of the vertical members of the lattice. The cage can be enlarged or contracted by the addition of panel units. It is easily assembled and dissembled without special tools and compactly stacked by nesting of the sections.

U.S. Pat. No. 4,677,788, issued Jul. 7, 1987 to Mastandrea, shows a support for tomato plants and the like to reinforce them while growing. It is preferably of plastic material having a bottle shape with an elongated neck. Such neck is progressively increased in diameter from the top to the base portion. At the points of increasing diameter, there is a shoulder serving as a stop for a slip-fitted neck portion. On the shoulder, is supported a wheel-like ring onto which the plants may be tied. Several such rings of increasing diameter of sleeve are provided. The neck instead may be progressively tapered downwardly and outwardly with the wheel-like rings held in place by the taper. Holes are provided at a distance above the bottom of the base portion to provide a reservoir of water for stabilizing the tube in the soil.

U.S. Pat. No. 5,640,802, issued Jun. 24, 1997 to Elliott, claims a support assembly for growing tomato plants which allows ready access to the plant during the various stages of growth by utilizing interchangeable parts including post sections having a tapered member (A) on a bottom end and a tapered socket (B) on the other end for joining the sections to form continuous posts having vertically spaced seating locations (C), and horizontal supports (D) having sockets (E) which fit securely onto post sections and spaced vertically to form modules that may be stacked in vertical relation and thereby added progressively to meet the needs engendered by growth of the plant and to permit ready access to the plant.

U.S. Pat. No. 4,026,068, issued May 31, 1977 to Tepper, shows a tomato plant support which uses plural stakes or uprights in surrounding relation about the plant and lateral members extending from these stakes to support the tomato-laden vines of the plant, but wherein the lateral members are intentionally not continuous, as is the case in prior art counterparts. Specifically, the discontinuity, or openings in the vine support structure, facilitate the relocation of each vine from a lower to a higher elevation support, in response to the growth of the plant.

What is needed is a multiple component, size adaptable, assembly system for an organically configured plant support structure for a growing plant in the configuration of a tree trunk with a strong root structure and tree branches to allow a plant to grow in a natural growth pattern for maximum growth and yield and minimal loss of produce.

BRIEF SUMMARY OF THE INVENTION

An object of the present invention is to provide a multiple component, size adaptable, assembly system for an organically configured plant support structure for a growing plant in the configuration of a tree trunk with a strong root structure and tree branches to allow a plant to grow in a natural growth pattern for maximum growth and yield, the assembled trellis structure having a strong base formed of three arched pointed rigid support prongs inserted into the ground for maximum strength and stability supporting a rigid trunk-like structure in a vertical position to support a trunk portion of the plant and organically configured rigid support branches with adjustable ties to support the branches and edible yield of the plant to enable tall plants to grow to full height with maximum yield and a minimum of dropped produce.

Another object of the present invention is to provide a multiple component plant support structure in which each plant support component is molded in a flat plane so that the plant support components are stacked and packaged with the base component, connectors, and ties in a flat box for storing, transporting, and selling in a kit form.

In brief, the present invention provides a multiple component, height adjustable, assembly system for an organically configured plant support structure for a growing plant. The plant support structure comprises a plurality of removably interconnecting components forming a rigid trunk-like structure having limb-like arms and branch-like multi-directional fingers extending from the trunk-like structure to form an organic tree-like organically configured plant support structure.

A base component is configured with a vertical trunk-like support and at least three arched pointed rigid support prongs rigidly connected to the trunk-like support extending outwardly and downwardly in a spaced array around a base of the trunk-like support, the at least three support prongs inserted into the ground to maintain the trunk portion in an upright vertical position for maximum strength and stability.

The plant support structure further comprises a plurality of upwardly tapering interconnecting plant support components having vertical trunk-like extensions to configure the height of the plant support at varying desired heights so that plant support components may be added to make the plant support taller as a plant grows taller or for a tall plant and may be removed to make the plant support shorter for new plants or different plants which grow to different heights. Each of the plant support components has a plurality of organically configured spaced and multi-directional tapering limb-like structures extending outwardly in different directions from the trunk-like extensions, so that when the base prongs are inserted in the ground the plant support is structured like a small tree rooted in the ground to enable a plant to grow in a natural configuration with the strong support of the multi-pronged base and trunk-like extensions to support the stem or trunk of the plant and the extended tapering limb-like and branch-like structures giving natural support with spacing to allow the branches of the plant to grow to their fullest natural growth with maximum fruit yield (including fruits, vegetables, berries and any other plant produce) and minimal loss of produce.

Ties to attach the growing plant to the plant support are made of cotton or other soft material and come in random lengths for different sizes and shapes of plant branches and limbs and stems.

The organic plant support structure is preferably molded of a weatherproof material having a deep natural brown tree color with a bark-like textured surface to give the appearance of an attractive miniature winter tree in the off-season and provide a textured surface to better support the plant branches and the plant ties.

The claw-like base with multiple inserted prongs is structured to accommodate the tallest tree for the largest variety of tomatoes and other tall plants and has can be inserted into the soil 12" in depth.

The present invention comprises plant support structural components which (with the exception of the base structural component) are configured with the trunk portion, limb portions, and branch portions all in a flat plane so that the flat plane plant support structural components when not in use can be disassembled and packed in a flat stacked array adjacent to the base structural component in a box to be stored or transported and may be sold in a kit form including: a 12" three-claw base having a 6" stem, an 18" section, two one foot mid sections, one (1) two foot topper, connectors, and ties of various lengths.

The plant support structure can be assembled in a variety of heights by combining different plant structural component sections together. The base 18" section and the 2' top section can be assembled to form a four-foot plant support structure. Adding a single one foot mid section will raise the height to five feet and finally adding the second one foot mid section will extend the height to six feet.

The unique organic configuration of the present invention is attractive and resolves all of the negative issues that growers of tomatoes and other produce plants experience each year. The organic plant support will sustain the weather and the plant will retain the crop until it is picked. The growing plant will receive even amounts of water and sun because the plant will grow naturally and adhere to the organic tree configuration. The present invention will promote a higher yield than any other apparatus on the market with little to no loss of produce.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 1 is an exploded perspective view of the base component and the structural support components of the present invention aligned for assembly of a plant support structure of maximum height;

FIG. 2 is an exploded perspective view of the connector components of the invention aligned for assembly to be used as a connector between two adjacent structural support components or between the base component and an adjacent structural component;

FIG. 3 is a perspective view of the base component and two of the structural support components of the present invention assembled for use as a small plant support structure;

FIG. 4 is a perspective view of the base component and three of the structural support components of the present invention assembled for use as a medium sized plant support structure;

DETAILED DESCRIPTION OF THE INVENTION

Figure 5:
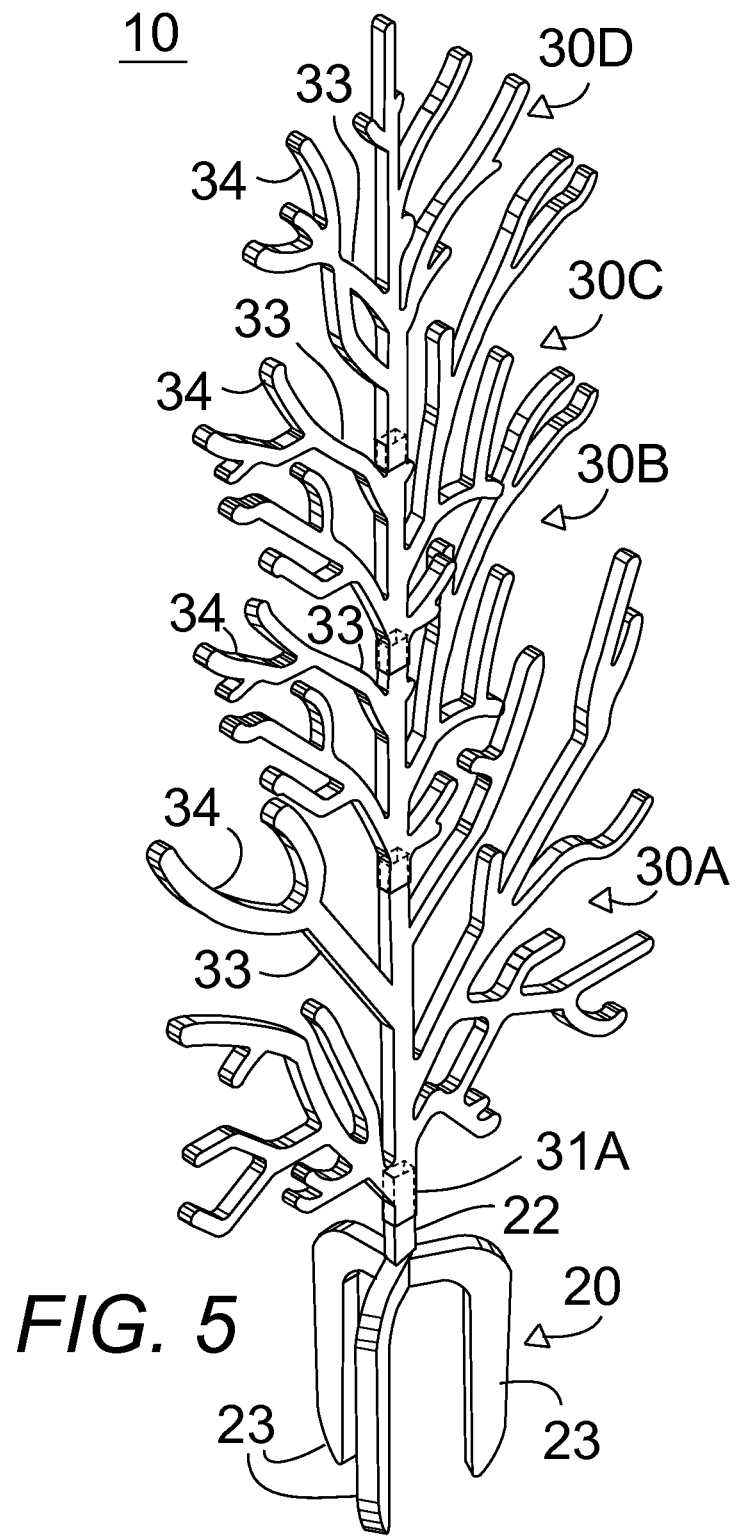
FIG. 5 is a perspective view of the base component and the structural support components of the present invention assembled for use as a plant support structure of maximum height.

In FIGS. 1-7, the present invention comprises a multiple component assembly system 10 for an organically configured, height adjustable plant support structure for a growing plant in the configuration of a small tree with a strong root structure supporting a trunk, tree limbs, and tree branches for supporting growing plants for full support and natural organic growth of the plants.

In FIGS. 1 and 3-5, the plant support structure 10 comprises a base component 20 and a plurality of interconnecting plant support components 30A, 30B, 30C, and 30D removably attached together and to the base component 20 to form a height adjustable organically configured plant support structure to support growing plants.

In FIG. 1, he base component 20 comprises a rigid trunk-like structure 22 configured in a vertical position to support the plurality of plant support components 30A-30D, at least three arched pointed rigid support prongs 23 rigidly connected to the trunk-like structure extending outwardly and downwardly therefrom in a spaced array around a bottom of the trunk-like structure 22, the at least three support prongs inserted into the ground to maintain the trunk-like structure 22 in an upright vertical position.

The plurality of plant support components 30A-30D each comprise an interchangeable interconnecting trunk extension 31A, 31B, 31C and 31D to extend the height of the plant support at varying heights by adding at least one plant support component to make the plant support taller, as shown by the progression in height from FIG. 3 to FIG. 4 to FIG. 5, to support taller plants and to support a growing plant as the growing plant grows taller, or removing at least one plant support structure (reverse progression from FIG. 5 back to FIG. 3) to make the plant support structure shorter for new plants or different plants which grow to different heights. Each of the plant support components comprises a plurality of organically configured spaced and multi-directional limb-like supports 33 extending outwardly and generally upwardly from the trunk-like structures and branch-like supports 34 extending from the branch-like supports 33 outwardly in different directions, so that when the components are interconnected and the base prongs 23 are inserted in the ground, the plant support structure 10 is configured like a small tree rooted in the ground to support a growing plant and provide a plurality of directional supports and adequate space between the plurality of directional supports so that the growing plant is guided to grow in a natural configuration to allow limbs and branches of the growing plant to grow to their fullest natural growth and sufficient spacing between supports to permit unhindered growth of produce growing on the growing plant to allow maximum produce yield and minimal loss of produce.

Different means may be used for interconnecting the components to maintain the integrity of the plant support structure in an outdoor environment and to allow assembly and disassembly and interchangeability of the plant support components to create alternate plant support structure configurations and sizes.

A structural means for interconnecting the components comprises that each of the components is fabricated of durable weather resistant material molded with a center trunk-like configuration having at least one end which fits interchangeably with an end of a center trunk-like configuration of an adjacent component.

In FIG. 2, a metal connector system 40 for interconnecting the components comprises a spring 44 loaded snap fit sleeve connector 48 attached between mating ends of adjacent trunk-like configuration inserts 41A in adjacent components to allow pushing the mating ends together and pulling the mating ends apart without the use of tools. A center spring 44 with two opposing scissor leafs 45 having protrusions 46 fits inside a sleeve connector 48 with mating openings 42 at each end to removably receive the protrusions 46 as the connector sleeve removably interconnects the metal inserts 41A with mating metal flanges 43 framing the opening in each end 22 and 31A of adjacent trunk-like structures.

The means for interconnecting the plant support components may alternately comprise mating telescopically interconnected friction-fit ends of adjacent components to allow friction fitting the mating ends together and taking the ends apart without the use of tools.

Figure 7:
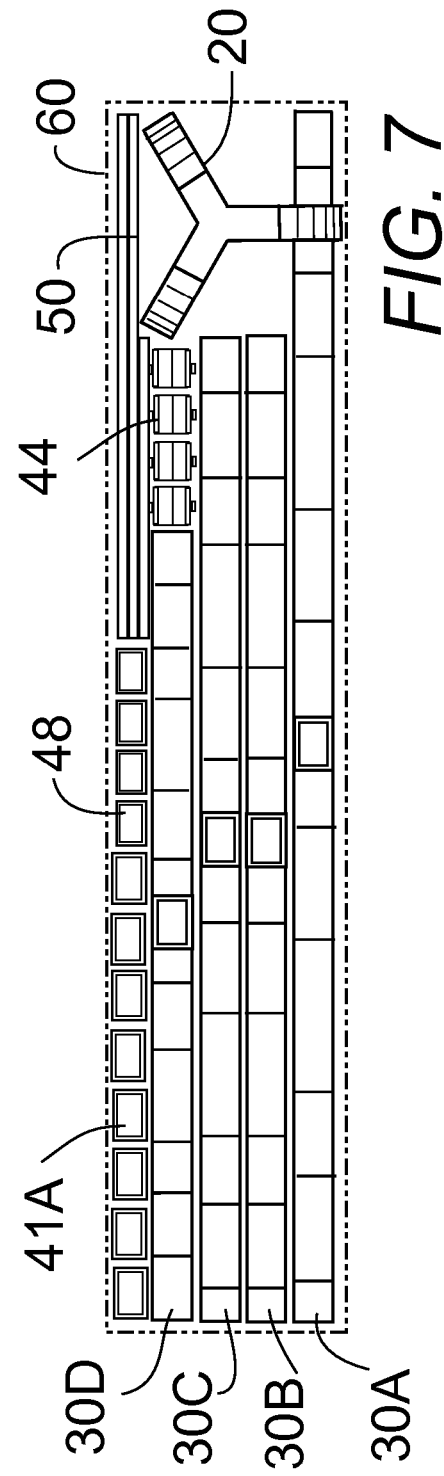
FIG. 7 is a side elevational view of all of the components of the present invention disassembled and stacked for packaging in a box for storing, transporting, or selling the present invention as a kit ready to assemble without tools.

In FIG. 7, a means for attaching portions of a growing plant to the trunk-like structures, limb-like supports, and branch-like supports of the plant support structure preferably comprises a plurality of soft textured fabric strips 50 of a plurality of sizes for attaching the different portions of the growing plant to the different plant support and structural components to support the growing plant while leaving adequate space between the growing plant and the plant support structure to permit growth of the growing plant and adequate space for produce growing on the growing plant to grow to maximum size and to be supported on the plant support structure without dropping from the plant support structure.

Figure 6:
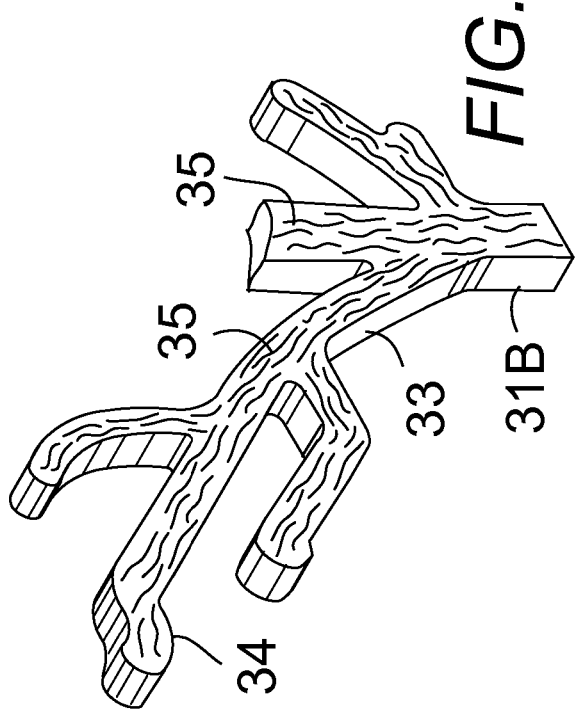
FIG. 6 is an enlarged partial perspective view of a portion of one of the structural support components showing the textured bark-like surface.

In FIG. 6, the components of the plant support structure are each preferably formed with an outer textured surface 35 configured and colored to resemble tree bark providing a high friction surface to prevent slippage of the means for attaching the portions of the growing plant to the plant support structure and prevent slippage of the portions of the growing plant attached to the plant support structure.

In FIG. 1, the base component 20 preferably has three equally spaced prongs 23 configured with a downwardly pointing point and a rounded shoulder 24 extending from the trunk-like structure 22 to the prong 23 each configured like a stake to be firmly secured in the soil by stepping down on the rounded shoulders forcing the prongs into the ground forming a root-like structure to permit leaving the plant support structure in a desirable growing location year round. The overall tree-like shape of the plant support structure 10 and the outer textured surface 50 configured and colored to resemble tree bark give the plant support structure 10 a natural appearance of a small bare tree in the non-growing season.

Means for attaching lighting elements to the plant support structure may comprise the ties 50 or clips or wire or other connecting materials so that the plant support structure can be used as a decorative structure during the non-growing season.

In FIG. 7, the plant support components 30A-30D are each configured with the trunk-like structure 31A-31D, the limb-like supports 33, and the branch-like supports 34 all in a flat plane so that the plant support components, when not in use, can be disassembled and packed in a flat stacked array and stored adjacent to the base component 20, the means for interconnecting the components 40, and the means for attaching portions of a growing plant (such as ties 50), all in a flat box 60 to be stored, transported, or sold in kit form.

In use, the components are interconnected into any desired tree-like configuration of a desired height, as shown in FIGS. 3-5. The base prongs 23 are inserted in the ground and various portions of a growing plant in the soil adjacent to the plant support structure are tied to various structure and support locations on the plant support structure so that the plant can grow in a natural configuration with maximum growth and minimum loss of produce.

The plant support structure can be used in any planting location including a traditional garden in the ground, a planter, a greenhouse, or any other location where plants will grow.

In the non-growing season the plant support structure can be left in place to mark a desired planting location for the next season or used with lights as a decorative miniature tree.

It is understood that the preceding description is given merely by way of illustration and not in limitation of the invention and that various modifications may be made thereto without departing from the spirit of the invention as claimed.

What is claimed is:

1. A multiple component assembly system forming a height adjustable plant support structure in the configuration of a small tree with a root structure supporting a trunk, tree limbs, and tree branches for supporting growing plants for full support and natural growth of the plants, the system comprising:

a base component and a plurality of interconnecting plant support components removably attached together and to the base component to form the height adjustable plant support structure; the base component comprising a rigid first structure configured in a vertical position to support the plurality of plant support components, said first structure having at least three arched pointed rigid support prongs rigidly connected to and extending outwardly and downwardly therefrom in a spaced array around a bottom of the first structure, the at least three support prongs configured to be inserted into the ground to maintain the first structure in an upright vertical position; the plurality of plant support components each comprising an interchangeable interconnecting trunk extension to extend the height of the plant support at varying heights by adding at least one of the plant support components to make the plant support structure taller to support taller plants and to support a growing plant as the growing plant grows taller, or by removing at least one of the plant support components to make the plant support structure shorter for new plants or different plants which grow to different heights, each of the plant support components having a plurality of spaced and multi-directional second supports and third supports extending outwardly in different directions from each of the respective plurality of trunk extensions, so that when the plant support components are interconnected and the base prongs are inserted in the ground, the plant support structure is configured like a small tree rooted in the ground to support a growing plant and provide a plurality of directional supports and space between the plurality of directional supports;

means for interconnecting the plant support components to maintain the integrity of the plant support structure in an outdoor environment and to allow assembly and disassembly and interchangeability of the plant support components to create alternate plant support structure configurations and sizes; means for attaching portions of a growing plant to the first structure, the second supports, and the third supports of the plant support structure to support the growing plant while leaving space between the growing plant and the plant support structure wherein the first structure is configured to resemble a trunk of a tree, the second supports are configured to resemble a limb of a plant, and the third supports are configured to resemble a branch of a plant.

2. The system of claim 1, wherein the plurality of plant support components are each formed with an outer textured surface configured and colored to resemble tree bark, the surface providing a high friction surface to prevent slippage of the means for attaching the portions of the growing plant to the plant support structure and prevent slippage of the portions of the growing plant attached to the plant support structure.

3. The system of claim 2, wherein the multiple pronged base is configured to be firmly secured in soil to permit leaving the plant support structure in a desirable growing location year round and the overall shape of the plant support structure and the outer textured surface are configured and colored to resemble tree bark giving the plant support structure a natural appearance of a small bare tree.

4. The system of claim 3, further comprising means for attaching lighting elements to the plant support structure.

5. The system of claim 1, wherein the means for attaching portions of a growing plant to respective ones of the first structure, the second supports, and the third supports of the plant support structure comprises a plurality of soft textured fabric strips of a plurality of sizes for attaching the different portions of the growing plant to the different plant support components.

6. The system of claim 1, wherein each of the plant support components is fabricated of durable weather resistant material molded with a center portion having at least one end which fits interchangeably with an end of an additional center portion of an adjacent plant support component.

7. The system of claim 6, wherein the means for interconnecting the plant support components comprises a spring loaded snap fit connector attached between mating ends of the adjacent center portions of adjacent plant support components to allow pushing the mating ends together and pulling the mating ends apart without the use of tools.

8. The system of claim 6, wherein the means for interconnecting the plant support components comprises mating telescopically interconnected friction-fit ends of adjacent plant support components to allow friction fitting the mating ends together and taking the ends apart without the use of tools.

* * * * *